United States Patent [19]

Gagne

[11] Patent Number: 4,935,596
[45] Date of Patent: Jun. 19, 1990

[54] SHUTOFF DETECTOR FOR UNSTABLE PLASMA OR COMBUSTION FLAME

[75] Inventor: Peter H. Gagne, Brookfield, Conn.

[73] Assignee: The Perkin-Elmer Corporation, Norwalk, Conn.

[21] Appl. No.: 341,509

[22] Filed: Apr. 21, 1989

[51] Int. Cl.⁵ .................................................. B23K 9/00
[52] U.S. Cl. ........................... 219/121.54; 219/130.21; 219/121.57; 315/111.51
[58] Field of Search ....................... 219/121.54, 121.57, 219/121.56, 130.4, 130.21, 129; 340/384 R, 384 E; 315/111.21, 111.51

[56] References Cited

U.S. PATENT DOCUMENTS

| | | | |
|---|---|---|---|
| 3,679,865 | 7/1972 | Jesnitzer et al. | 219/130.01 |
| 4,109,130 | 8/1978 | Oku | 219/130.21 |
| 4,480,475 | 11/1984 | Tsao et al. | 219/130.21 |
| 4,602,147 | 7/1986 | Gell | 340/384 R |
| 4,609,810 | 9/1986 | O'Brien et al. | 219/130.21 |
| 4,766,287 | 8/1988 | Morrisroe et al. | 219/121.52 |

FOREIGN PATENT DOCUMENTS

| | | | |
|---|---|---|---|
| 3333151 | 3/1985 | Fed. Rep. of Germany | 219/130.21 |
| 0872095 | 10/1981 | U.S.S.R. | 219/121.54 |
| 1430824 | 4/1976 | United Kingdom | 219/130.21 |

*Primary Examiner*—M. H. Paschall
*Attorney, Agent, or Firm*—H. S. Ingham; E. T. Grimes

[57] ABSTRACT

A plasma flame apparatus capable of self-extinguishing in the event of an unstable plasma discharge includes an inductively coupled plasma torch for producing a plasma flame which will have an acoustical signal characteristic of an unstable plasma discharge. A power generator is coupled to the plasma torch for powering the plasma. A microphone is receptive of the acoustical signal for effecting a representative electrical signal. A comparator generates a output electrical signal when the representative signal exceeds a selected level. The output signal is coupled to the power generator of the plasma flame such as to shut off the power generator when the representative signal exceeds the selected level.

16 Claims, 2 Drawing Sheets

SHUTOFF DETECTOR FOR UNSTABLE PLASMA OR COMBUSTION FLAME

The present invention relates to apparatus for automatically extinguishing an unstable discharge of a flame, and particularly to such an apparatus associated with a plasma flame having an acoustical emission characteristic of the unstable discharge.

BACKGROUND OF THE INVENTION

Under some conditions a flame can have an unstable discharge mode which, as a minimum, is undesirable for use of the flame and, in a worse circumstance, may burn out the apparatus. Even if such condition is a rarity it may be necessary or desirable to provide an automatic shutoff for the flame apparatus should the condition occur.

One type of flame generator susceptible to the problem is an inductively coupled plasma generator such as is used for quantitative spectral analysis. An example is disclosed in U.S. Pat. No. 4,766,287 (Morrisroe et al) of the present assignee and sold as a model P40 by The Perkin-Elmer Corporation, Norwalk, Conn.

Flame-out detectors are conventional, particularly for combustion flames such as in furnaces or torch devices. These detect light or heat from the flame and provide a feedback signal that typically turns off a fuel supply valve or pump motor. However, in certain circumstances an unstable flame, particularly in a plasma device, has an unstable mode that still emits light and heat. Therefore, flame-out detectors do not reliably protect against the circumstances of an instability.

Therefore objects of the present invention are to provide a novel detection apparatus for automatically extinguishing an unstable discharge of a flame, particularly for an inductively coupled plasma, and to provide an improved plasma apparatus capable of self-extinguishing the plasma in the event of an unstable plasma discharge.

SUMMARY OF THE INVENTION

The foregoing and other objects are achieved by a detection apparatus including a transducer means receptive of an acoustical signal produced by an unstable discharge of a flame particularly a plasma type flame, for effecting a representative electrical signal representative of the acoustical signal. A comparator means is receptive of the representative signal for generating an output signal when the representative signal exceeds a selected level. A coupling means couples the output signal to a power generator of the plasma discharge such as to shut off the power generator when the representative signal exceeds the selected level. The acoustical signal associated with the unstable discharge thereby effects extinguishment of the plasma flame. In a preferred embodiment a means is receptive of an initiation signal representative of initiation of the plasma flame, for producing a time signal representing time from the initiation. A delay means is receptive of the time signal and the output signal for delaying the output signal to the coupling means for a selected period of time from the initiation.

The detection apparatus is particularly advantageous when combined with an inductively coupled plasma.

DETAILED DESCRIPTION OF THE INVENTION

The present invention is associated with flame apparatus of the type that can have a generally undesirable unstable discharge mode for the flame. Often there is an acoustical signal or noise characteristic of the instability. This instability could involve a combustion flame but is of particular concern for a plasma generating apparatus, in which the plasma torch can have a meltdown or similar destruction when the plasma flame is in the unstable mode. The plasma may be of the type generated by a DC arc. However a particularly advantageous example is an induction coupled plasma torch. Broadly, the term "flame" as used herein and in the claims refers to either a combustion flame or a plasma flame.

Figure 1:
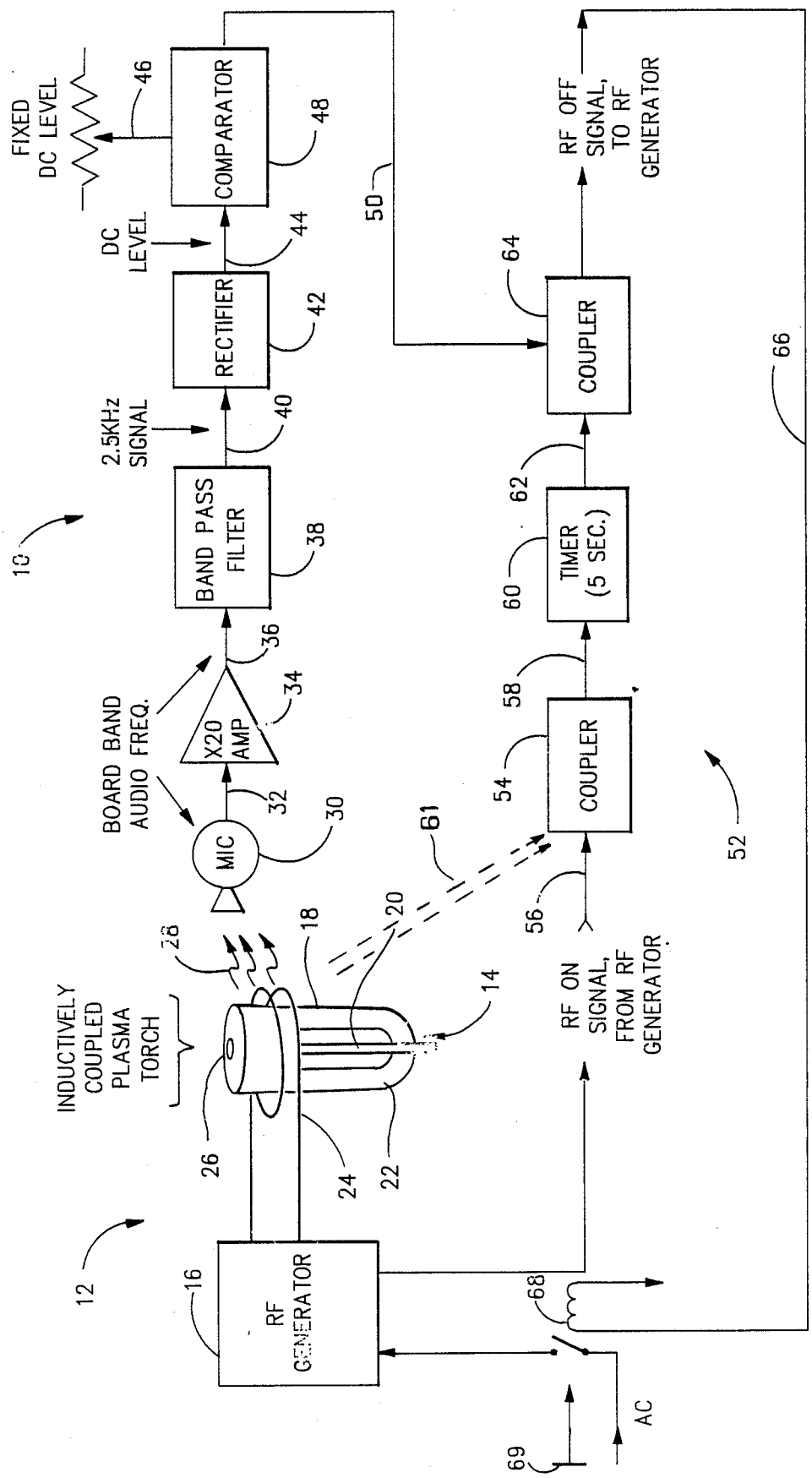
FIG. 1 is a schematic block diagram of an apparatus according to the present invention.

FIG. 1 is a schematic diagram illustrating extinguishing apparatus 10 of the present invention in association with an induction plasma system 12. Such a plasma system has two main components, namely a plasma torch 14 and a radio frequency (RF) power generator 16. These components may be conventional such as disclosed in the aforementioned U.S. Pat. No. 4,766,287. The torch includes a tubular torch body 18 with a duct 20 therein receptive of a plasma-forming gas such as argon, and may also have additional tubing for sample injection or the like (not shown), and channelling 22 for water cooling. A coil 24 of several turns encompasses tubular body 18 and is connected electrically to power generator 16 and may be part of the RF oscillator. The RF power is coupled through the coil to induce a plasma 26 in the argon which may issue from the torch body. Normally the plasma is fairly steady and is constricted by the gas flow and electromagnetic effects so that the torch body is not overheated. Such a plasma is useful, for example, as a spectroscopy source.

Occasionally, if operating conditions are improper the plasma discharge transforms from the normal mode to an unstable discharge mode. This condition may no longer be a constricted plasma and the torch body, even if water cooled, can be destroyed by melting. The unstable condition also involves oscillations having at least one characteristic acoustical frequency. Thus an acoustical signal 28 is emitted with a resonant frequency that depends on the torch configuration; a typical frequency is 2.5 KHz.

According to the present invention acoustical emission 28 is received by a transducer, microphone 30 which effects a low power electrical signal on a shielded cable 32. This signal is received and amplified as necessary by an amplifier 34 to produce a representative electrical signal through a line 36 at the acoustical frequencies.

This representative signal is passed through a band pass filter 38 which is tuned to pass through a characteristic signal having substantially the characteristic frequency, e.g. 2.5 KHz. The signal goes on a further line 40 to a rectifier 42 for conversion to a DC signal on an output line 44, the DC signal having a voltage proportional to the characteristic signal intensity (voltage or power). This DC signal level is compared to a selected DC voltage level 46 by means of a comparitor circuit 48, generating an output signal on a line 50 when and if the selected level 46 is exceeded. The DC level is selected to correspond to a threshold above background acoustical noise including noise from the normal plasma. Collectively filter 38, rectifier 42, selected level 46 and comparitor 48 herein constitute a comparitor means.

Since a plasma may be unstable momentarily during startup, a timing means 52 is preferably used to delay implementation of the detection system. Initiation of the plasma may be detected by an optical detector or, more simply as illustrated herein, by detecting a power signal representative of the power generator being turned on for the plasma flame. This signal may be tapped from any convenient point in the power circuit such as a DC voltage associated with the plate voltage for the RF oscillator.

Timing circuit 52 includes a coupler 54 receptive of the DC power voltage as a signal on a line 56 for producing a function signal on a line 58 to a timer 60. Alternatively coupler 54 is a photodetector receptive of a light beam 61 from the plasma. The timer produces a time signal for a selected, suitable period of time from initiation, such as 5 seconds on a line 62. A delay circuit 64 is receptive of the time signal from line 62 and the output signal from line 50, and delays transit of the output signal (which could be modified by circuit 64 but is still effectively the output signal) on a feedback line 66 for the selected time period. A coupling means including line 66 leads to power generator 16 where it connects to shut off the generator if the output signal is applied after the starting delay time. The coupling is conveniently made via a normally-on relay 68 associated with the AC power input to the generator with a reset 69.

Thus a circuit is provided which detects an acoustical emission from an unstable plasma flame, and converts the emission to an electrical signal. A timing circuit senses when the plasma is initiated to delay application of the electrical signal until after an initial period. If an unstable discharge occurs after the initial period, the acoustical emission signal associated with the unstable discharge effects extinguishment of the unstable discharge.

Figure 2:
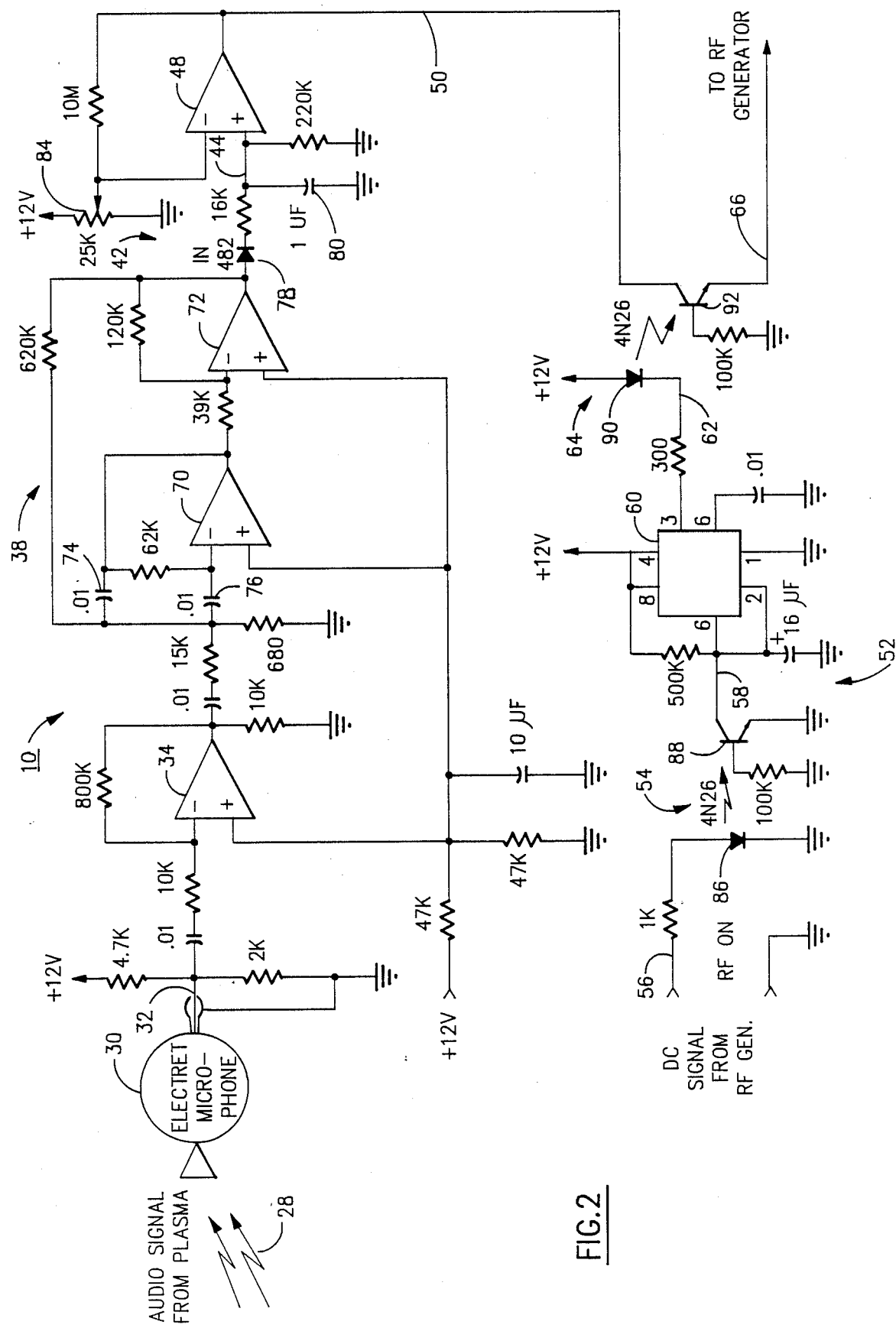
FIG. 2 is a schematic circuit diagram of details of the block diagram of FIG. 1.

Details of a suitable circuit for carrying out the present invention are shown in FIG. 2, which utilizes conventional electronic components which (except the microphone) are in a integrated circuit. Components have numeral identifications corresponding to those of FIG. 1. The acoustical emission 28 from the plasma is received by an electret microphone 30. The low power signal therefrom is amplified about 20 times by an operational amplifier 34 to produce the representative signal, which is fed into the band pass filter which comprises two operational amplifiers 70,72 and capacitors 74,76. The narrow band, characteristic signal is rectified through a diode 78 and further filtered by a capacitor 80 to produce the DC signal on line 44. The comparitor circuit comprises a further operational amplifier 48 with its inverting input connected to a resistance 84 with a voltage dividing tap and an applied voltage which provides for the selected DC level. The output signal goes on line 50 to timing system 52.

The DC voltage from the power generator, representing power on for the plasma torch, is applied via line 56 to a first opto-coupler 54 comprising a light emitting diode 86 and a photodetector 88. A detection signal therefrom is received by a logic timer circuit 60, starting a clock therein and generating a time signal on line 62 for the initial selected time period. The time signal controls the output signal via a second opto-coupler 64 with diode 90 and detector 92, to initially block the output signal. The latter is applied back to the generator as described for FIG. 1.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A detection apparatus for automatically extinguishing an unstable discharge of an induction plasma flame having an acoustical signal characteristic of the unstable discharge, comprising:

transducer means receptive of an acoustical signal produced by an unstable discharge of an induction plasma flame, for effecting a representative electrical signal representative of the acoustical signal;

comparator means receptive of the representative signal for generating an output signal when the representative signal exceeds a selected level; and coupling means for coupling the output signal to a power generator of the plasma discharge such as to shut off the power generator when the representative signal exceeds the selected level;

whereby the acoustical signal associated with the unstable discharge effects extinguishment of the plasma flame.

2. An apparatus according to claim 1 further comprising timing means receptive of an initiation signal representative of initiation of the plasma flame, for producing a time signal representing time from the initiation, and delay means receptive of the time signal and the output signal for delaying transit of the output signal to the coupling means for a selected period of time from the initiation.

3. An apparatus according to claim 2 further comprising optical means receptive of light from the plasma flame for generating the initiation signal.

4. An apparatus according to claim 2 wherein the initiation signal is a power signal representative of the power generator being turned on for the plasma flame.

5. An apparatus according to claim 1 wherein the acoustical signal has a characteristic frequency, and the comparator means comprises a band pass filter receptive of the representative signal for passing through a characteristic electrical signal having substantially the characteristic frequency, a rectifier receptive of the characteristic signal for producing a DC signal proportional to the characteristic signal, and a comparator circuit receptive of the DC signal for generating the output signal when the DC signal exceeds a selected DC level.

6. An apparatus according to claim 5 further comprising timing means receptive of a initiation signal representative of initiation of the plasma flame, for producing a time signal representing time from the initiation, and delay means receptive of the time signal and the output signal for delaying transit of the output signal to the coupling means for a selected period of time from the initiation.

7. An apparatus according to claim 6 further comprising optical means receptive of light from the plasma flame for generating the initiation signal.

8. An apparatus according to claim 6 wherein the initiation signal is a power signal representative of the power generator being turned on to the plasma flame.

9. An induction plasma flame apparatus capable of self-extinguishing the plasma flame in the event of an unstable plasma discharge, comprising:
   an plasma torch for producing a plasma flame discharge having a characteristic acoustical signal when the plasma discharge is unstable;
   a power generator coupled to the plasma torch for powering the plasma flame;
   transducer means receptive of the acoustical signal for effecting a representative electrical signal representative of the acoustical signal;
   comparator means receptive of the representative signal for generating an output electrical signal when the representative signal exceeds a selected level; and
   coupling means for coupling the output signal to the power generator such as to shut off the power generator when the representative signal exceeds the selected level;
   whereby the acoustical signal characteristic of the unstable discharge effects extinguishment of the plasma flame.

10. An apparatus according to claim 9 further comprising timing means receptive of an initiation signal representative of initiation of the plasma flame, for producing a time signal representing time from the initiation, and delay means receptive of the time signal and the output signal for delaying transit of the output signal to the coupling means for a selected period of time from the initiation.

11. An apparatus according to claim 10 further comprising optical means receptive of light from the plasma flame for generating the initiation signal.

12. An apparatus according to claim 10 wherein the initiation signal is a power signal representative of the power generator being turned on for the plasma flame.

13. An apparatus according to claim 9 wherein the acoustical signal has a characteristic frequency, and the comparator means comprises a band pass filter receptive of the representative signal for passing through a characteristic electrical signal having substantially the characteristic frequency, a rectifier receptive of the characteristic signal for producing a DC signal proportional to the characteristic signal, and a comparator circuit receptive of the DC signal for generating the output electrical signal when the DC signal exceeds a selected DC level.

14. An apparatus according to claim 13 further comprising timing means receptive of an initiation signal representative of initiation of the plasma flame, for producing a time signal representing time from the initiation, and delay means receptive of the time signal and the output signal for delaying transit of the output signal to the coupling means for a selected period of time from the initiation.

15. An apparatus according to claim 14 further comprising optical means receptive of light from the plasma flame for generating the initiation signal.

16. An apparatus according to claim 14 wherein the initiation signal is a power signal representative of the power generator being turned on to the plasma flame.

* * * * *

UNITED STATES PATENT OFFICE
CERTIFICATE OF CORRECTION

Patent No. 4,935,596           Dated June 19, 1990

Inventor(s) Peter H. Gagne

It is certified that error appears in the above-identified patent and that said Letters Patent is hereby corrected as shown below:

In column 5, line 10; before "plasma torch" insert --induction--.

Signed and Sealed this

Twenty-first Day of April, 1992

Attest:

HARRY F. MANBECK, JR.

*Attesting Officer*                *Commissioner of Patents and Trademarks*